US 9,628,966 B2

(12) United States Patent
Liu

(10) Patent No.: US 9,628,966 B2
(45) Date of Patent: Apr. 18, 2017

(54) METHOD AND DEVICE FOR SENDING MESSAGE

(71) Applicant: Xiaomi Inc., Beijing (CN)

(72) Inventor: Guoming Liu, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/804,539

(22) Filed: Jul. 21, 2015

(65) Prior Publication Data

US 2016/0057587 A1 Feb. 25, 2016

Related U.S. Application Data

(63) Continuation of application No. PCT/CN2015/074608, filed on Mar. 19, 2015.

(30) Foreign Application Priority Data

Aug. 19, 2014 (CN) .......................... 2014 1 0410385

(51) Int. Cl.
*H04W 4/12* (2009.01)
*H04M 3/42* (2006.01)

(52) U.S. Cl.
CPC .............. *H04W 4/12* (2013.01); *H04M 3/42* (2013.01)

(58) Field of Classification Search
CPC .... G06F 3/04895; G06F 98/46; G06F 3/0481; G06F 9/4443; G06F 3/0485; G06F 3/04883; G06F 3/04886
USPC ................... 718/100; 715/781; 455/406, 466
See application file for complete search history.

(56) References Cited

U.S. PATENT DOCUMENTS

| 8,676,155 B2 * | 3/2014 | Fan .......................... H04W 4/12 370/428 |
| 2002/0081998 A1 | 6/2002 | Tsuchiyama |
| 2008/0094356 A1 * | 4/2008 | Ording ................ G06F 3/04886 345/157 |
| 2009/0251420 A1 | 10/2009 | Do et al. |
| 2009/0282360 A1 | 11/2009 | Park et al. |
| 2011/0070901 A1 * | 3/2011 | Alward .................. G06Q 10/10 455/466 |
| 2011/0191675 A1 | 8/2011 | Kauranen |
| 2013/0139107 A1 | 5/2013 | Jung |

(Continued)

FOREIGN PATENT DOCUMENTS

| CN | 1413043 A * | 4/2003 |
| CN | 101576801 A | 11/2009 |

(Continued)

OTHER PUBLICATIONS

International Search Report of PCT/CN2015/074608, from the State Intellectual Property Office of China, mailed May 26, 2015.

(Continued)

*Primary Examiner* — Lester Kincaid
*Assistant Examiner* — Gary Lafontant
(74) *Attorney, Agent, or Firm* — Finnegan, Henderson, Farabow, Garrett & Dunner LLP

(57) ABSTRACT

A method for sending a message for use in a terminal including a touch screen is provided. The method includes acquiring an operation signal generated from a one-time operation performed by a user on the touch screen; determining a sending time of a message according to the operation signal; and sending the message when it is detected that a system time of the terminal reaches the sending time.

15 Claims, 10 Drawing Sheets

(56) References Cited

U.S. PATENT DOCUMENTS

| | | | |
|---|---|---|---|
| 2013/0159941 A1 | 6/2013 | Langlois et al. | |
| 2013/0215051 A1 | 8/2013 | Kim | |
| 2013/0305249 A1* | 11/2013 | Kawashima | G06F 3/04895 718/100 |
| 2014/0181729 A1* | 6/2014 | Lin | G06F 3/0481 715/781 |
| 2014/0189591 A1 | 7/2014 | Park et al. | |

FOREIGN PATENT DOCUMENTS

| | | | | |
|---|---|---|---|---|
| CN | 201967000 U | | 9/2011 | |
| CN | 102467337 A | | 5/2012 | |
| CN | 102508568 A | | 6/2012 | |
| CN | 103220424 A | | 7/2013 | |
| CN | 103257822 A | * | 8/2013 | G06F 3/0485 |
| CN | 103279352 A | | 9/2013 | |
| CN | 103596152 A | | 2/2014 | |
| CN | 104238853 A | | 12/2014 | |
| JP | 08-249125 A | | 9/1996 | |
| JP | 11-088950 A | | 3/1999 | |
| JP | 2004-128589 A | | 4/2004 | |
| JP | 2008-089355 A | | 4/2008 | |
| JP | 2012-225873 A | | 11/2012 | |
| JP | 2014-081789 A | | 5/2014 | |
| RU | 39415 U1 | | 4/2004 | |
| WO | WO 99/49679 | | 9/1999 | |
| WO | WO 2011/092677 A1 | | 8/2011 | |

OTHER PUBLICATIONS

European Search Report of EP 15181404.3, from the European Patent Office, mailed Dec. 15, 2015.
"A method for scheduling sending of a short message in Galaxy series mobile phones," issued on Jul. 17, 2014, by the Esarang.
Notification on Results of Invention Patentability Check, dated Sep. 14, 2016, in counterpart Russian Application No. 2015124377/08(038108) and English translation thereof.

* cited by examiner

METHOD AND DEVICE FOR SENDING MESSAGE

CROSS-REFERENCE TO RELATED APPLICATIONS

The present application is a continuation of International Application No. PCT/CN2015/074608, filed Mar. 19, 2015, which is based upon and claims priority to Chinese Patent Application No. 201410410385.9, filed Aug. 19, 2014, the entire contents of all of which are incorporated herein by reference.

TECHNICAL FIELD

The present disclosure generally relates to the field of computer technology and, more particularly, to a method and a device for sending a message.

BACKGROUND

With increasing popularity of messaging applications, a user may use a messaging application installed on a terminal to communicate with another user. For example, the user may want to send a message at a certain specified time with a delay.

Conventionally, to send a message with a delay, a terminal may acquire an edited message, and display a time-option list including a year option item, a month option item, a date option item, and a moment option item. Each time option item includes a plurality of values, an upward button for selecting a value above a current value, and a downward button for selecting a value below a current value. Each value selected by the user through pressing the upward button or the downward button is received to obtain a sending time of the message. The message is stored in the terminal for sending at the obtained sending time.

SUMMARY

According to a first aspect of the present disclosure, there is provided a method for sending a message for use in a terminal including a touch screen, the method comprising: acquiring an operation signal generated from a one-time operation performed by a user on the touch screen; determining a sending time of a message according to the operation signal; and sending the message when it is detected that a system time of the terminal reaches the sending time.

According to a second aspect of the present disclosure, there is provided a device, comprising: a processor; a touch screen; and a memory for storing instructions executable by the processor; wherein the processor is configured to: acquire an operation signal generated from a one-time operation performed by a user on the touch screen; determine a sending time of a message according to the operation signal; and send the message when it is detected that a system time of the device reaches the sending time.

According to a third aspect of the present disclosure, there is provided a non-transitory computer-readable storage medium having instructions stored therein that, when executed by a processor in a terminal, cause the terminal to perform a method for sending a message, the method comprising: acquiring an operation signal generated from a one-time operation performed by a user on a touch screen of the terminal; determining a sending time of a message according to the operation signal; and sending the message when it is detected that a system time of the terminal reaches the sending time.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Figure 1:
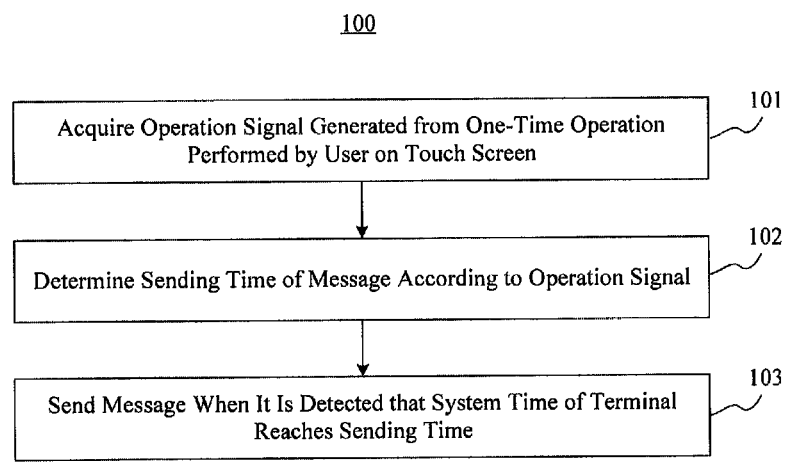
FIG. 1 is a flow chart of a method for sending a message, according to an exemplary embodiment.

FIG. 1 is a flow chart of a method 100 for sending a message, according to an exemplary embodiment. For example, the method 100 is used in a terminal including a touch screen. Referring to FIG. 1, the method 100 includes the following steps.

In step 101, an operation signal generated from a one-time operation performed by a user on the touch screen is acquired.

In the present embodiment, the one-time operation refers to an operation performed on the touch screen during a period from the user's finger contacting the touch screen until the user's finger leaving the touch screen.

In step 102, a sending time of a message is determined according to the operation signal.

In the present embodiment, the message may be a short message edited through an application program such as a short message application, or may be an instant message edited through an instant communication tool. The type of the message is not limited in the present disclosure. Contents of the message may include at least one of a text, a picture, an audio, or a video.

In step 103, the message is sent when it is detected that a system time of the terminal reaches the sending time.

In the present embodiment, the terminal may send a message with a delay. After the sending time of the message is determined, the terminal monitors the system time, and when the system time of the terminal reaches the sending time of the message, the terminal sends the message.

In the present embodiment, the terminal may determine the sending time of the message according to the one-time operation, instead of based on the user selecting a value in each time option item by pressing an upward button or a downward button for multiple times. Thus, time consumed in setting the sending time may be saved, and thereby the efficiency in setting the sending time of the message is improved.

Figure 2A:
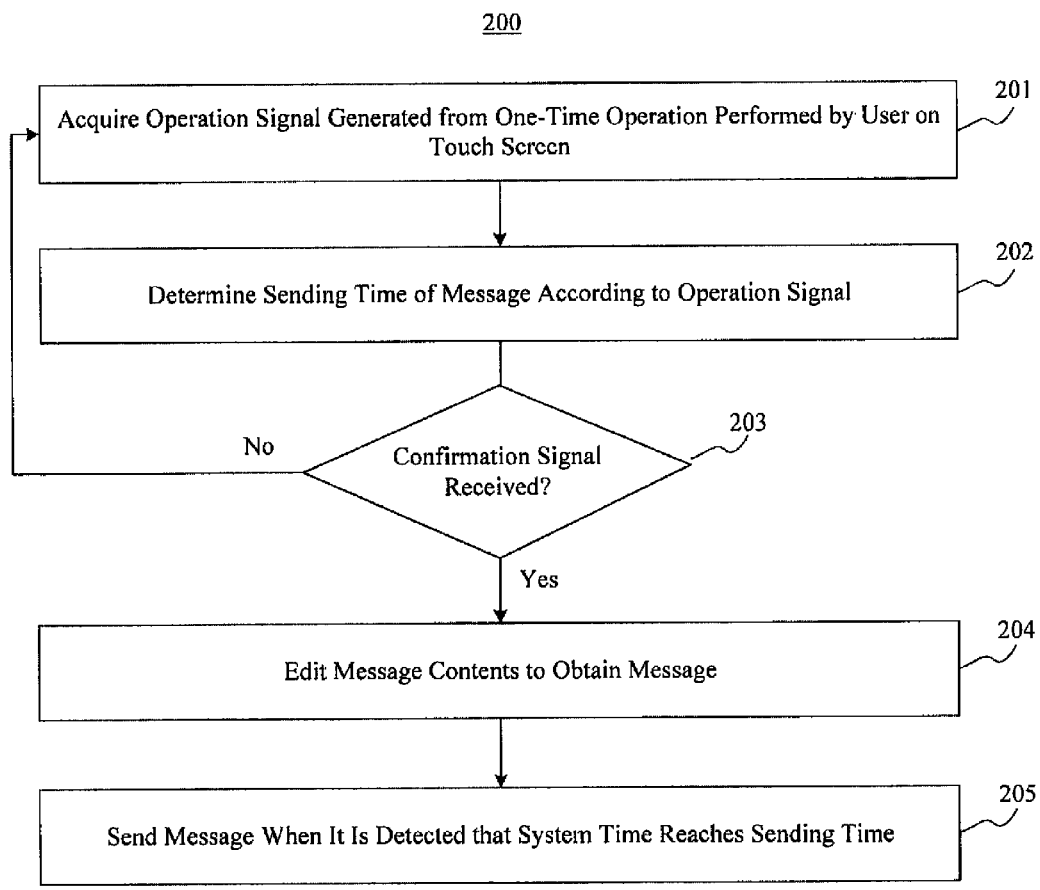
FIG. 2A is a flow chart of a method for sending a message, according to an exemplary embodiment.

FIG. 2A is a flow chart of a method 200 for sending a message, according to an exemplary embodiment. For example, the method 200 may be used in a terminal including a touch screen. Referring to FIG. 2A, the method 200 includes the following steps.

In step 201, an operation signal generated from a one-time operation performed by a user on the touch screen is acquired.

In the present embodiment, the one-time operation refers to an operation performed on the touch screen during a period from the user's finger contacting the touch screen until the user's finger leaving the touch screen. When the user performs the one-time operation on the touch screen, the user may perform one or more sub-operations on the touch screen, each sub-operation being, e.g., a sliding operation, a press-and-hold operation, etc. For example, during the one-time operation, the user may perform the sliding operation once. Also for example, during the one-time operation, the user may perform first and second sliding operations, with an end position of the first sliding operation being a start position of the second sliding operation. As another example, during the one-time operation, the user may perform a sliding operation and a press-and-hold operation, with an end position of the sliding operation being an operation position of the press-and-hold operation. The operation manner of the one-time operation is not limited in the present disclosure.

In exemplary embodiments, different one-time operations generate different operation signals. Accordingly, the terminal may record a sub-operation signal corresponding to each sub-operation in a one-time operation, and combine the sub-operation signals according to a performing sequence of the sub-operations to form an operation signal corresponding to the one-time operation. For example, when the one-time operation performed by the user on the touch screen includes one sliding operation, the terminal records a sliding signal generated from the sliding operation, and determines the sliding signal as the operation signal. As another example, when the one-time operation performed by the user on the touch screen includes a sliding operation and a press-and-hold operation performed in sequence, the terminal records a sliding signal generated from the sliding operation, and also records a press-and-hold signal generated from the press-and-hold operation, and combines the sliding signal and the press-and-hold signal to form the operation signal.

In exemplary embodiments, a triggering condition for the terminal to acquire an operation signal may be preset. For example, the terminal acquires the operation signal after the terminal receives a triggering signal. Also for example, the terminal acquires the operation signal on a predetermined display page, such as a message listing page.

Figure 2B:
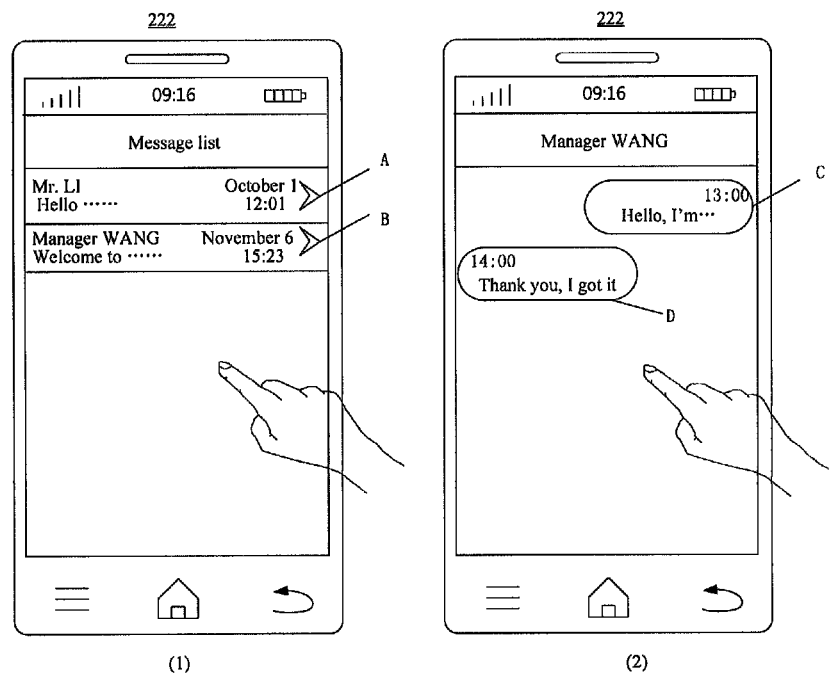
FIG. 2B is a schematic diagram of an interface displaying a message listing page, according to an exemplary embodiment.

FIG. 2B is a schematic diagram of an interface 222 displaying a message listing page on the terminal, according to an exemplary embodiment. In one exemplary embodiment, the message listing page includes at least one message item. Each message item may contain one or more messages communicated between a user of the terminal and another user. For example, in FIG. 2B(1), the message listing page includes a message list including a message item A and a message item B. The message item A contains messages communicated between the user of the terminal and, e.g., Mr. LI, and the message item B contains messages communicated between the user of the terminal and, e.g., Manager WANG. In another exemplary embodiment, the message listing page may include messages communicated between the user of the terminal and another user. For example, in FIG. 2B(2), the message listing page includes a message C sent from the user to Manager WANG at 13:00, and a message D sent from Manager WANG to the user at 14:00.

In exemplary embodiments, when the triggering condition is that the terminal acquires the operation signal on a predetermined display page, the terminal detects whether the predetermined display page is displayed, and after detecting that the predetermined display page is displayed, the terminal acquires the operation signal generated from a one-time operation performed by the user on the touch screen.

Referring back to FIG. 2A, in step 202, a sending time of a message is determined according to the operation signal.

In exemplary embodiments, after the operation signal is acquired, the terminal may determine the sending time of a message according to the operation signal, for sending the message with a delay. The message may be a short message edited through an application program such as a short message application, or may also be an instant message edited through an instant communication tool. The type of the message is not limited in the present disclosure.

In one exemplary embodiment, the sending time includes one or more time items, such as year, month, day, hour, minute and second. Accordingly, determining the sending time of the message according to the operation signal includes: 1) for each of the one or more time items, acquiring a sub-operation signal corresponding to the time item from the operation signal, and determining a corresponding value of the time item according to the sub-operation signal, and 2) combining values of all of the one or more time items to form the sending time. For example, the sub-operation signal is a signal generated from a sub-operation of the one-time operation, and the time item is one of year, month, day, hour, minute and second.

In the above embodiment, since the sending time consists of time items such as year, month, day, hour, minute and second, a sub-operation may be set for each time item, and the value of each time item may be determined according to a sub-operation signal generated from the sub-operation. For example, a value of the hour may be determined through a sliding signal, and a value of the minute may be determined through a press-and-hold signal, and so on. After the value of each time item is determined, the terminal combines the values of all the time items to form the sending time. For example, the value of the hour is determined to be 10 according to the sliding operation, and the value of the minute is determined to be 10 according to the press-and-hold operation. Therefore, the sending time is determined to be 10:10.

In exemplary embodiments, acquiring a sub-operation signal corresponding to each time item from the operation signal is implemented as follows.

In a first implementation, if the operation signal includes at least one sliding signal and at least one press-and-hold signal, and each press-and-hold signal is adjacent to two sliding signals, an $i^{th}$ sub-operation signal (i being a natural number) in the operation signal is determined as a sub-operation signal corresponding to an $i^{th}$ time item, the $i^{th}$ sub-operation signal being a sliding signal or a press-and-hold signal.

In a second implementation, if the operation signal includes at least two sliding signals and adjacent sliding signals have different sliding directions, an $i^{th}$ sliding signal in the operation signal is determined as a sub-operation signal corresponding to an $i^{th}$ time item.

In a third implementation, if the operation signal includes at least two sliding signals and at least one press-and-hold signal, and each press-and-hold signal is adjacent to two sliding signals, when a press-and-hold time period of each press-and-hold signal exceeds a predetermined threshold, an $i^{th}$ sliding signal in the operation signal is determined as a sub-operation signal corresponding to an $i^{th}$ time item.

In the first implementation, the operation signal includes at least one sliding signal and at least one press-and-hold signal, and each press-and-hold signal is adjacent to two sliding signals. For example, during the one-time operation, one press-and-hold operation is performed between every two sliding operations. Since operation types of adjacent sub-operations are different, the terminal may distinguish time items according to the operation types indicated by the respective sub-operation signals, and use the sliding signal(s) and the press-and-hold signal(s) to determine the value of each of the time items. Therefore, an $i^{th}$ sub-operation signal in the one-time operation signal corresponds to an $i^{th}$ time item, and may be used to determine a corresponding value of the $i^{th}$ time item.

For example, during the one-time operation, a first sliding sub-operation is performed, then a press-and-hold sub-operation is performed at an end position of the first sliding sub-operation, and then a second sliding sub-operation is performed with the operation position of the press-and-hold sub-operation as the start position. Since the sub-operations are performed in sequence, a first sliding signal included in the operation signal corresponds to a first time item, a press-and-hold signal included in the operation signal corresponds to a second time item, and a second sliding signal included in the operation signal corresponds to a third time item.

Figure 2C:
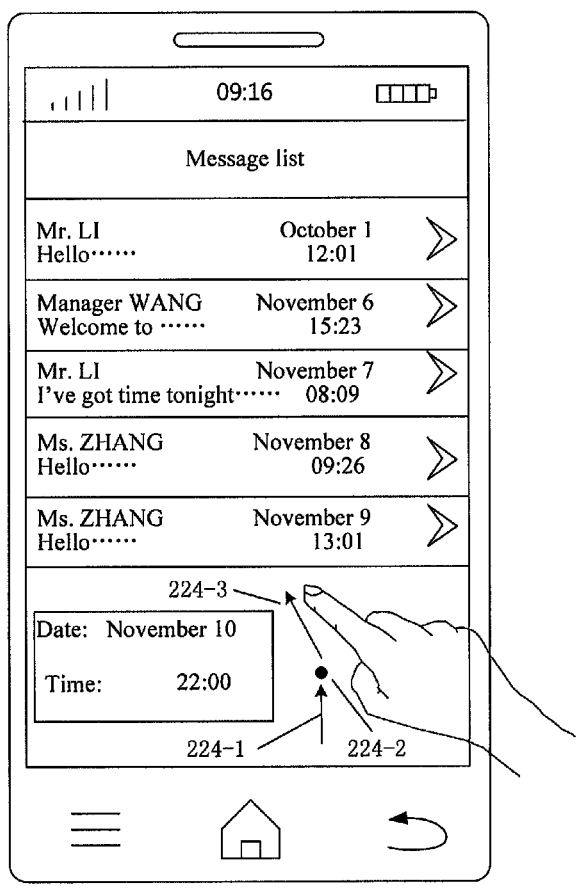
FIG. 2C is a schematic diagram of an interface on which a one-time operation is performed, according to an exemplary embodiment.

FIG. 2C is a schematic diagram of an interface 224 on which the above one-time operation in the first implementation is performed, according to an exemplary embodiment. Referring to FIG. 2C, a first arrow 224-1 denotes the first sliding operation, a dot 224-2 denotes the press-and-hold operation, and a second arrow 224-3 denotes the second sliding operation.

In the second implementation, the operation signal includes at least two sliding signals and adjacent sliding signals have different sliding directions. Since adjacent sliding signals have different sliding directions, the terminal may distinguish time items according to the sliding directions, and use each sliding signal to determine a value of the corresponding time item. Therefore, an $i^{th}$ sliding signal in the operation signal corresponding to an $i^{th}$ time item, may be used to determine a corresponding value of the $i^{th}$ time item.

For example, during the one-time operation, a first sliding sub-operation is performed upwards, then a second sliding sub-operation is performed rightward with an end position of the first sliding sub-operation as a start position of the second sliding sub-operation. Since the sub-operations are performed in sequence, a first sliding signal included in the operation signal corresponds to a first time item, and a second sliding signal included in the operation signal corresponds to the second time item.

Figure 2D:
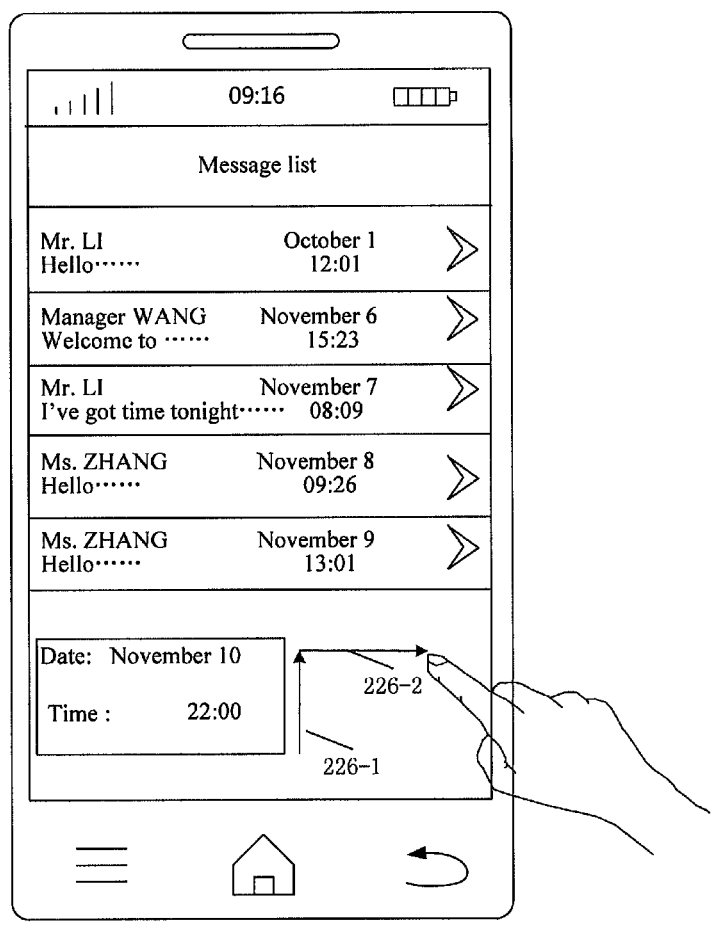
FIG. 2D is a schematic diagram of an interface on which a one-time operation is performed, according to an exemplary embodiment.

FIG. 2D is a schematic diagram of an interface 226 on which the above one-time operation in the second implementation is performed, according to an exemplary embodiment. Referring to FIG. 2D, a first arrow 226-1 denotes the first sliding operation, and a second arrow 226-2 denotes the second sliding operation.

In the third implementation, the operation signal includes at least two sliding signals and at least one press-and-hold signal, and each press-and-hold signal is adjacent to two sliding signals. For example, during the one-time operation, one press-and-hold operation is performed between every two sliding operations. Accordingly, the terminal may distinguish time items according to the sliding signals, and use each sliding signal to determine a value of a corresponding time item. Therefore, an $i^{th}$ sliding signal in the operation signal corresponds to an $i^{th}$ time item, and may be used to determine a value of the $i^{th}$ time item.

In the third implementation, after a press-and-hold signal generated from a press-and-hold operation is acquired, the terminal detects whether a press-and-hold time period of the press-and-hold signal exceeds a predetermined threshold. If it is detected that the press-and-hold time period of the press-and-hold signal exceeds the predetermined threshold, a following sliding operation is determined as a new sliding operation for setting a value of a different time item. If it is detected that the press-and-hold time period does not exceed the predetermined threshold, the following sliding operation is determined as a sliding operation for modifying a previous sliding operation. For example, the following sliding operation is determined to be a continuation of the previous sliding operation. Also for example, the predetermined threshold may be initially set to 3 seconds, and may be subsequently modified to 5 seconds.

For example, during the one-time operation, a first sliding sub-operation is performed, then a press-and-hold sub-operation is performed at an end position of the first sliding operation, then a second sliding sub-operation is performed with the operation position of the press-and-hold sub-operation as a start position. If the press-and-hold time period exceeds the predetermined threshold, since the sub-operations are performed in sequence, the operation signal includes the first sliding signal and the second sliding signal. Accordingly, the first sliding signal corresponds to a first time item, and the second sliding signal corresponds to a second time item.

Figure 2E:
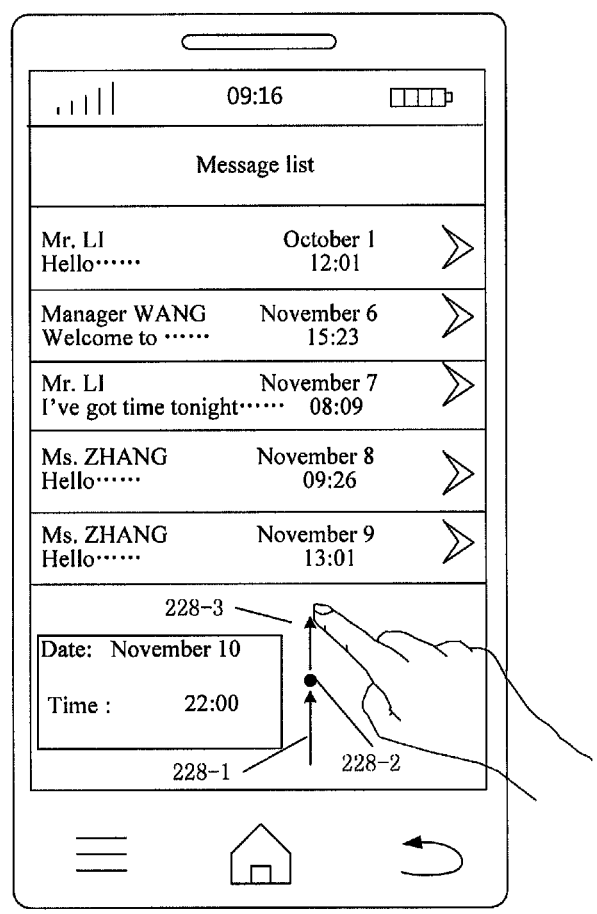
FIG. 2E is a schematic diagram of an interface on which a one-time operation is performed, according to an exemplary embodiment.

FIG. 2E is a schematic diagram of an interface 228 on which the above one-time operation in the third implementation is performed, according to an exemplary embodiment. Referring to FIG. 2E, a first arrow 228-1 denotes the first sliding operation, a dot 228-2 denotes the press-and-hold operation, and a second arrow 228-3 denotes the second sliding operation.

In exemplary embodiments, the one-time operation may include one sliding operation. For example, if the messages in the message list are arranged from top to bottom in order of time from earliest to latest, and a latest message is arranged at the bottom of the message list, since the sending time is later than the receiving time of a latest received message, a sliding operation from bottom to top of the message list may be determined as a one-time operation, and the larger the distance of the upward sliding is, the later the sending time will be. Also for example, if the messages in the message list are arranged from top to down in order of time from latest to earliest, and the latest message is arranged at the top of the message list, since the sending time is later than the receiving time of the latest received message, a sliding operation from top to bottom of the message list may be determined as a one-time operation, and the larger the distance of the downward sliding is, the later the sending time will be.

In exemplary embodiments, after the sub-operation signals corresponding to respective time items are acquired, values of the time items are determined according to the sub-operation signals.

For example, if the sub-operation signal corresponding to a time item is a sliding signal, the value of the time item is determined according to a sliding distance of the sliding signal, the sliding distance being positively correlated to the value of the time item.

Also for example, if the sub-operation signal corresponding to a time item is a press-and-hold signal, the value of the time item is determined according to a press-and-hold time period of the press-and-hold signal, the press-and-hold time period being positively correlated to the value of the time item.

In one exemplary embodiment, the terminal may preset a positive correlation between a sliding distance and a value of a time item. The value of the time item may be calculated in real time according to the sliding distance. For example, if the sliding distance is 3 mm, the value of the time item is calculated as 1 hour; if the sliding distance is 6 mm, the value of the time item is calculated as 2 hours and so on. Also for example, the value of the time item is adjusted according to an interval of the sliding distance. For example, if the sliding distance is 1-3 mm, the value of the time item is set to 1 hour; if the sliding distance is 3-6 mm, the value of the time item is set to 2 hours, and so on. This is not limited in the present embodiment. Similarly, the terminal may set the positive correlation between the press-and-hold time period and the value of the time item.

In exemplary embodiments, to improve the efficiency of setting the sending time, during the process when a user performs a sub-operation of the one-time operation, the terminal may determine a time item according to the corresponding sub-operation signal, and display the time item in real time, such that the user may determine whether to keep increasing the time item or decreasing the time item according to the displayed time item.

Referring back to FIG. 2A, in step 203, after the sending time of the message is determined, it is further detected whether a confirmation signal is received. The confirmation signal is configured to confirm that the determined sending time is accurate. If it is detected that the confirmation signal is received, the detection triggers performing step 204; and if it is detected that the confirmation signal is not received, the detection triggers performing step 201. After the sending time is determined according to the operation signal, the terminal confirms whether the sending time is accurate by performing step 203.

Figure 2F:
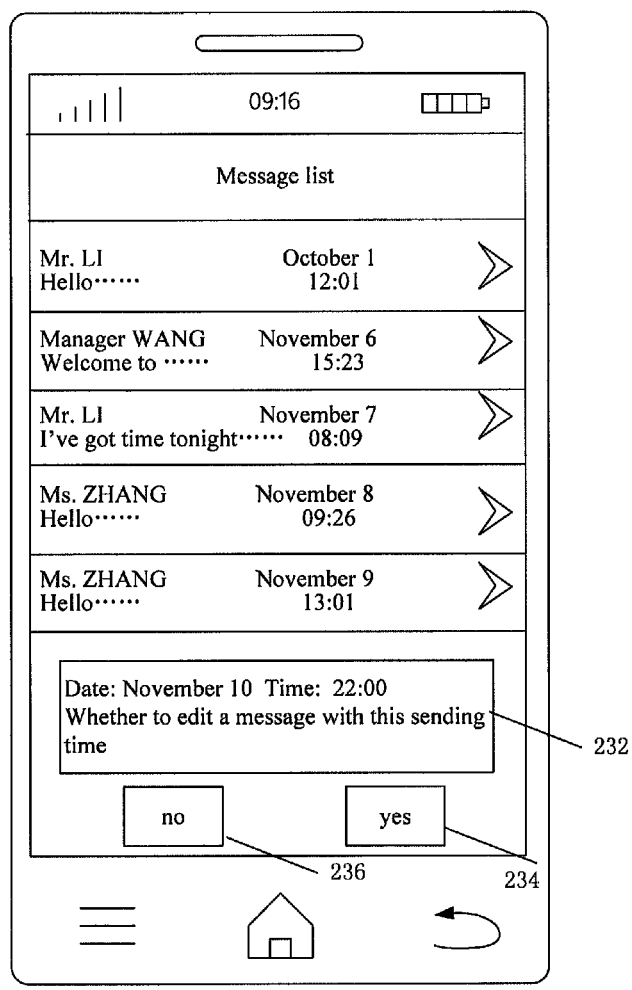
FIG. 2F is a schematic diagram of an interface for inquiring whether to edit a message, according to an exemplary embodiment.

In exemplary embodiments, the terminal may edit the message again after the sending time is determined. Accordingly, the terminal may acquire the confirmation signal by inquiring whether to edit the message. FIG. 2F is a schematic diagram of an interface 230 displayed on the terminal for inquiring whether to edit a message, according to an exemplary embodiment. Referring to FIG. 2F, before a confirmation signal is received, the terminal may display an inquiring message 232, e.g., "whether to edit a message with this sending time," in the interface 230, and provides a "yes" option 234 and a "no" option 236. When the terminal receives a signal generated from tapping the "yes" option 234 by a user, it is determined that the sending time is accurate, and the received signal is determined as the confirmation signal. When the terminal receives a signal generated from tapping the "no" option 236 by the user, it is determined that the sending time is not accurate, and the confirmation signal is not received.

Referring back to FIG. 2A, in step 204, message contents are edited to obtain the message, if it is detected that the confirmation signal is received.

For example, the terminal may edit the message contents in a corresponding application program to obtain the message. In the present embodiment, the message may be a short message edited through an application program, such as a short message application, or may also be an instant message edited through an instant communication tool. The type of the message is not limited in the present disclosure. The contents of the message may include at least one of a text, a picture, an audio, or a video.

The performing sequence of step 204 and steps 201-203 is not limited in the present disclosure. If step 204 is performed before step 201, the triggering condition for editing the message may be a triggering signal received by the terminal, or a predetermined operation signal received by the terminal in the message listing page, and the predetermined operation signal may be a long-press signal, a double-tap signal, or the like.

In step 205, the message is sent when it is detected that system time of the terminal reaches the sending time.

For example, after the sending time of the message is determined and the message is obtained, the terminal may cache the message and monitor the system time. When the terminal detects that the system time reaches the sending time of the message, the terminal sends the message.

In exemplary embodiments, the method 200 may further include: 1) adding the message to a delayed-sending queue, the delayed-sending queue being configured to store a message to be sent; 2) receiving an editing signal with respect to the message stored in the delayed-message queue; and 3) editing the message according to the editing signal.

For example, before the message is sent, the terminal may add the message to a delayed-sending queue to store the message, the delayed-sending queue being configured to store messages to be sent. When the terminal detects that the system time reaches the sending time, the terminal adds the message from the delayed-sending queue to an instant-sending queue, and sends the message from the instant-sending queue.

In one exemplary embodiment, after the terminal stores the message in the delayed-sending queue, if the system time has not yet reached the sending time, the terminal may display the message to the user through a predetermined user interface (UI). If the user needs to edit the message, the user may perform an editing operation to generate an editing signal. After receiving the editing signal, the terminal edits the message according to the editing signal. For example, the terminal may add additional contents to, or delete existing contents from, the message. The terminal may also edit the sending time of the message by advancing or postponing the sending time. In the illustrated embodiment, the terminal may edit the message contents before the message is sent, to correct any incorrect contents in the message, thereby avoiding sending an incorrect message.

By using the method 200, efficiency of sending the message and accuracy of the message are improved.

Figure 3:
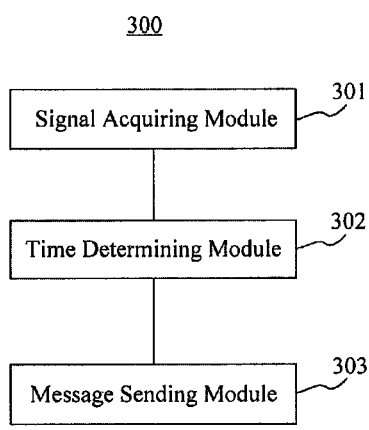
FIG. 3 is a block diagram of a device for sending a message, according to an exemplary embodiment.

FIG. 3 is a block diagram of a device 300 for sending a message, according to an exemplary embodiment. For example, the device 300 may be a terminal including a touch screen or a part of the terminal. Referring to FIG. 3, the device 300 includes a signal acquiring module 301, a time determining module 302, and a message sending module 303.

The signal acquiring module 301 is configured to acquire an operation signal generated from a one-time operation performed by a user on the touch screen.

The time determining module 302 is configured to determine a sending time of a message according to the operation signal acquired by the signal acquiring module 301.

The message sending module 303 is configured to send the message when it is detected that system time of the terminal reaches the sending time determined by the time determining module 302.

Accordingly, the sending time of the message may be inputted by acquiring the operation signal generated from the one-time operation, without the need for the user to select a value in each time item by pressing an upward button or a downward button for multiple times, to input the sending time of the message. Thus, efficiency of setting the sending time of the message is improved.

Figure 4:
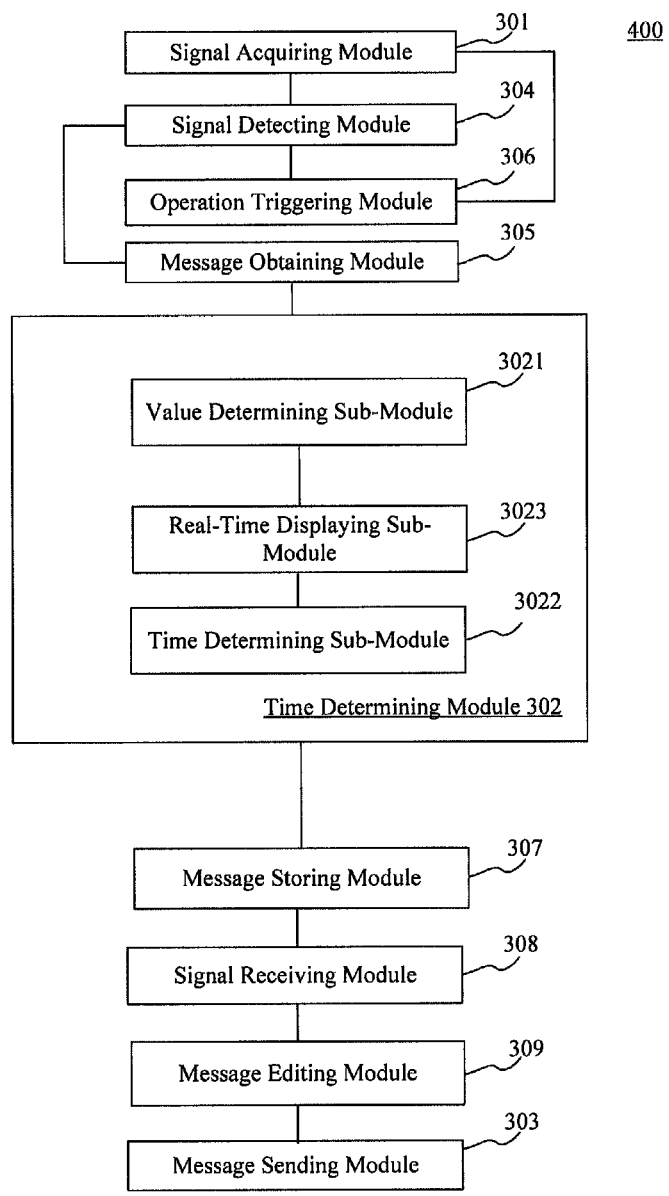
FIG. 4 is a block diagram of a device for sending a message, according to an exemplary embodiment.

FIG. 4 is a block diagram of a device 400 for sending a message, according to an exemplary embodiment. The device 400 may be a terminal including a touch screen or a part of the terminal. Referring to FIG. 4, the device 400 includes the signal acquiring module 301, the time determining module 302, and the message sending module 303 (FIG. 3).

In exemplary embodiments, the time determining module 302 includes a value determining sub-module 3021 and a time determining sub-module 3022.

The value determining sub-module 3021 is configured to, if the sending time includes one or more time items, for each of the one or more time items, acquire a sub-operation signal corresponding to the time item from the operation signal, and determine a corresponding value of the time item according to the sub-operation signal. The sub-operation signal is a signal generated from a sub-operation of the one-time operation, and the time item is one of year, month, day, hour, minute, and second.

The time determining sub-module 3022 is configured to combine values of all of the one or more time items determined by the value determining sub-module 3021 to form the sending time.

In exemplary embodiments, the time determining module 302 further includes a real-time displaying sub-module 3023. The real-time displaying sub-module 3023 is configured to display in real time the corresponding value of the time item determined according to the sub-operation signal.

In exemplary embodiments, the device 400 may further include a signal detecting module 304, a message obtaining module 305, and an operation triggering module 306.

The signal detecting module 304 is configured to, after the sending time of the message is determined, detect whether a confirmation signal is received. The confirmation signal is configured to confirm that the determined sending time is accurate.

The message obtaining module 305 is configured to, if the signal detecting module 304 detects that the confirmation signal is received, edit message contents to obtain the message.

The operation triggering module 306 is configured to, if the signal detecting module 304 detects that the confirmation signal is not received, trigger the signal acquiring module 301 to perform the acquiring of an operation signal generated from a one-time operation performed by a user on the touch screen.

In exemplary embodiments, the device 400 may further include a message storing module 307, a signal receiving module 308, and a message editing module 309.

The message storing module 307 is configured to add the message to a delayed-sending queue configured to store a message to be sent.

The signal receiving module 308 is configured to receive an editing signal with respect to the message added into the delayed-sending queue by the message storing module 307.

The message editing module 309 is configured to edit the message according to the editing signal received by the signal receiving module 308.

Figure 5:
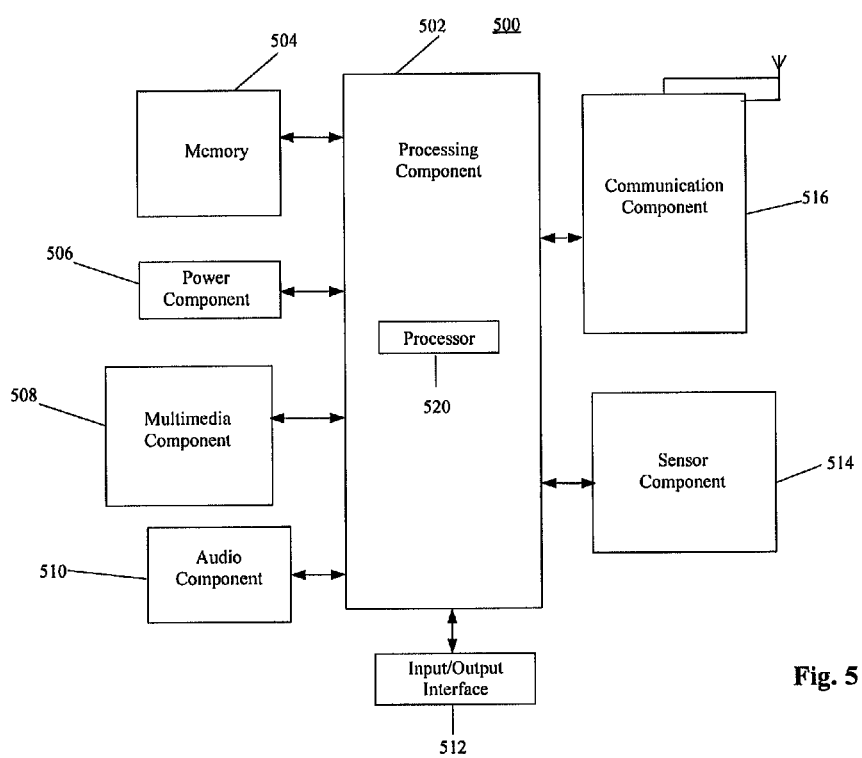
FIG. 5 is a block diagram of a device, according to an exemplary embodiment.

FIG. 5 is a block diagram of a device 500, according to an exemplary embodiment. For example, the device 500 may be a mobile phone, a computer, a digital broadcast terminal, a messaging device, a gaming console, a tablet, a medical device, exercise equipment, a personal digital assistant, and the like.

Referring to FIG. 5, the device 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the device 500, such as the operations associated with display, telephone calls, data communications, camera operations, and recording operations. The processing component 502 may include one or more processors 520 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the device 500. Examples of such data include instructions for any applications or methods operated on the device 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the device 500. The power component 506 may include a power management system, one or more power sources, and any other components associated with the generation, management, and distribution of power in the device 500.

The multimedia component 508 includes a screen providing an output interface between the device 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slidings, and gestures on the touch panel. The touch sensors may not only sense a boundary of a touch or sliding action, but also sense a period of time and a pressure associated with the touch or sliding action. In some embodiments, the multimedia component 508 includes a front camera and/or a rear camera. The front camera and the rear camera may receive an external multimedia datum while the device 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone configured to receive an external audio signal when the device 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the device 500. For instance, the sensor component 514 may detect an open/closed status of the device 500, relative positioning of components, e.g., the display and the keypad, of the device 500, a change in position of the device 500 or a component of the device 500, a presence or absence of user contact with the device 500, an orientation or an acceleration/deceleration of the device 500, and a change in temperature of the device 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the device 500 and other devices. The device 500 can access a wireless network based on a communication standard, such as WiFi, 2G, or 3G, or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In exemplary embodiments, there is also provided a non-transitory computer-readable storage medium including instructions, such as included in the memory 504, executable by the processor 520 in the device 500, for performing the above methods. For example, the non-transitory computer-readable storage medium may be a ROM, a RAM, a CD-ROM, a magnetic tape, a floppy disc, an optical data storage device, and the like.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may be further divided into a plurality of sub-modules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for sending a message for use in a terminal including a touch screen, the method comprising:
   acquiring, by the terminal, an operation signal generated from a one-time operation performed by a user on the touch screen, wherein the one-time operation includes one or more sub-operations, and is an operation performed on the touch screen during a period from the user's finger contacting the touch screen until the user's finger leaving the touch screen;
   determining, by the terminal, a sending time of a message according to the operation signal, wherein the determining includes:
      acquiring, from the operation signal, a plurality of sub-operation signals corresponding to a plurality of time items of the sending time, respectively; and
      determining corresponding values of the time items according to the sub-operation signals, respectively; and
   sending, by the terminal, the message when it is detected that a system time of the terminal reaches the sending time.

2. The method according to claim 1, wherein the determining of the sending time of the message comprises:
   combining the corresponding values of the time items to form the sending time, each of the time items being one of year, month, day, hour, minute, and second.

3. The method according to claim 2, wherein the determining of the corresponding value of a first time item of the time items according to a first sub-operation signal of the sub-operation signals comprises:
if the first sub-operation signal is a sliding signal generated from a sliding sub-operation of the one-time operation, determining the corresponding value of the first time item according to a sliding distance of the sliding sub-operation, the sliding distance being positively correlated to the corresponding value of the first time item; and
if the first sub-operation signal is a press-and-hold signal generated from a press-and-hold sub-operation of the one-time operation, determining the corresponding value of the first time item according to a press-and-hold time period of the press-and-hold sub-operation, the press-and-hold time period being positively correlated to the corresponding value of the first time item.

4. The method according to claim 2, further comprising:
displaying in real time the corresponding values of the time items determined according to the sub-operation signals, respectively.

5. The method according to claim 2, wherein the acquiring of the sub-operation signals comprises:
if the operation signal includes at least one sliding signal and at least one press-and-hold signal, and each press-and-hold signal is adjacent to two sliding signals, determining an $i^{th}$ sub-operation signal in the operation signal as a sub-operation signal corresponding to an $i^{th}$ time item, the sub-operation signal being a sliding signal or a press-and-hold signal;
if the operation signal includes at least two sliding signals and adjacent sliding signals have different sliding directions, determining an $i^{th}$ sliding signal in the operation signal as a sub-operation signal corresponding to an $i^{th}$ time item; and
if the operation signal includes at least two sliding signals and at least one press-and-hold signal and each press-and-hold signal is adjacent to two sliding signals, when a press-and-hold time period of each press-and-hold signal exceeds a predetermined threshold, determining an $i^{th}$ sliding signal in the operation signal as a sub-operation signal corresponding to an $i^{th}$ time item;
wherein i is a natural number.

6. The method according to claim 1, further comprising:
after the sending time is determined, detecting whether a confirmation signal is received, the confirmation signal being configured to confirm that the determined sending time is accurate;
if it is detected that the confirmation signal is received, editing message contents to obtain the message; and
if it is detected that the confirmation signal is not received, performing the acquiring of an operation signal generated from a one-time operation performed by a user on the touch screen.

7. The method according to claim 1, further comprising:
adding the message into a delayed-sending queue, the delayed-sending queue being configured to store messages to be sent;
receiving an editing signal with respect to the message added into the delayed-sending queue; and
editing the message according to the editing signal.

8. A device, comprising:
a processor;
a touch screen; and
a memory for storing instructions executable by the processor;

wherein the processor is configured to:
acquire an operation signal generated from a one-time operation performed by a user on the touch screen, wherein the one-time operation includes one or more sub-operations, and is an operation performed on the touch screen during a period from the user's finger contacting the touch screen until the user's finger leaving the touch screen;
determine a sending time of a message according to the operation signal, wherein determining a sending time includes:
acquiring, from the operation signal, a plurality of sub-operation signals corresponding to a plurality of time items of the sending time, respectively; and
determining corresponding values of the time items according to the sub-operation signals, respectively; and
send the message when it is detected that a system time of the device reaches the sending time.

9. The device according to claim 8, wherein the processor is further configured to:
combine the corresponding values of the time items to form the sending time, each of the time items being one of year, month, day, hour, minute, and second.

10. The device according to claim 9, wherein the processor is further configured to:
if a first sub-operation signal of the sub-operation signals is a sliding signal generated from a sliding sub-operation of the one-time operation, determine the corresponding value of a first time item of the time items according to a sliding distance of the sliding sub-operation, the sliding distance being positively correlated to the corresponding value of the first time item; and
if the first sub-operation signal is a press-and-hold signal generated from a press-and-hold sub-operation of the one-time operation, determine the corresponding value of the first time item according to a press-and-hold time period of the press-and-hold sub-operation, the press-and-hold time period being positively correlated to the corresponding value of the first time item.

11. The device according to claim 9, wherein the processor is further configured to:
display in real time the corresponding values of the time items determined according to the sub-operation signals, respectively.

12. The device according to claim 9, wherein the processor is configured to:
if the operation signal includes at least one sliding signal and at least one press-and-hold signal and each press-and-hold signal is adjacent to two sliding signals, determine an $i^{th}$ sub-operation signal in the operation signal as a sub-operation signal corresponding to an $i^{th}$ time item, the sub-operation signal being a sliding signal or a press-and-hold signal;
if the operation signal includes at least two sliding signals and adjacent sliding signals have different sliding directions, determine an $i^{th}$ sliding signal in the operation signal as a sub-operation signal corresponding to an $i^{th}$ time item; and
if the operation signal includes at least two sliding signals and at least one press-and-hold signal and each press-and-hold signal is adjacent to two sliding signals, when a press-and-hold time period of each press-and-hold signal exceeds a predetermined threshold, determine an $i^{th}$ sliding signal in the operation signal as a sub-operation signal corresponding to an $i^{th}$ time item;

wherein i is a natural number.

13. The device according to claim 8, wherein the processor is further configured to:

after the sending time is determined, detect whether a confirmation signal is received, the confirmation signal being configured to confirm that the determined sending time is accurate;

if it is detected that the confirmation signal is received, edit message contents to obtain the message; and if it is detected that the confirmation signal is not received, perform the acquiring of an operation signal generated from a one-time operation performed by a user on the touch screen.

14. The device according to claim 8, wherein the processor is configured to:

add the message into a delayed-sending queue, the delayed-sending queue being configured to store messages to be sent;

receive an editing signal with respect to the message added into the delayed-sending queue; and edit the message according to the editing signal.

15. A non-transitory computer-readable storage medium having instructions stored therein that, when executed by a processor in a terminal, cause the terminal to perform a method for sending a message, the method comprising:

acquiring an operation signal generated from a one-time operation performed by a user on a touch screen of the terminal, wherein the one-time operation includes one or more sub-operations, and is an operation performed on the touch screen during a period from the user's finger contacting the touch screen until the user's finger leaving the touch screen;

determining a sending time of a message according to the operation signal, wherein the determining includes:

acquiring, from the operation signal, a plurality of sub-operation signals corresponding to a plurality of time items of the sending time, respectively; and determining corresponding values of the time items according to the sub-operation signals, respectively; and sending the message when it is detected that a system time of the terminal reaches the sending time.

* * * * *